No. 778,133. PATENTED DEC. 20, 1904.
W. H. KEATES.
MOTOR VEHICLE.
APPLICATION FILED MAY 27, 1904.
NO MODEL. 2 SHEETS—SHEET 1.

Witnesses
Chas. K. Davies
Katie Hurst

Inventor
Warren H. Keates,
by E. W. Bradford
Attorney

No. 778,133. PATENTED DEC. 20, 1904.
W. H. KEATES.
MOTOR VEHICLE.
APPLICATION FILED MAY 27, 1904.
NO MODEL. 2 SHEETS—SHEET 2.
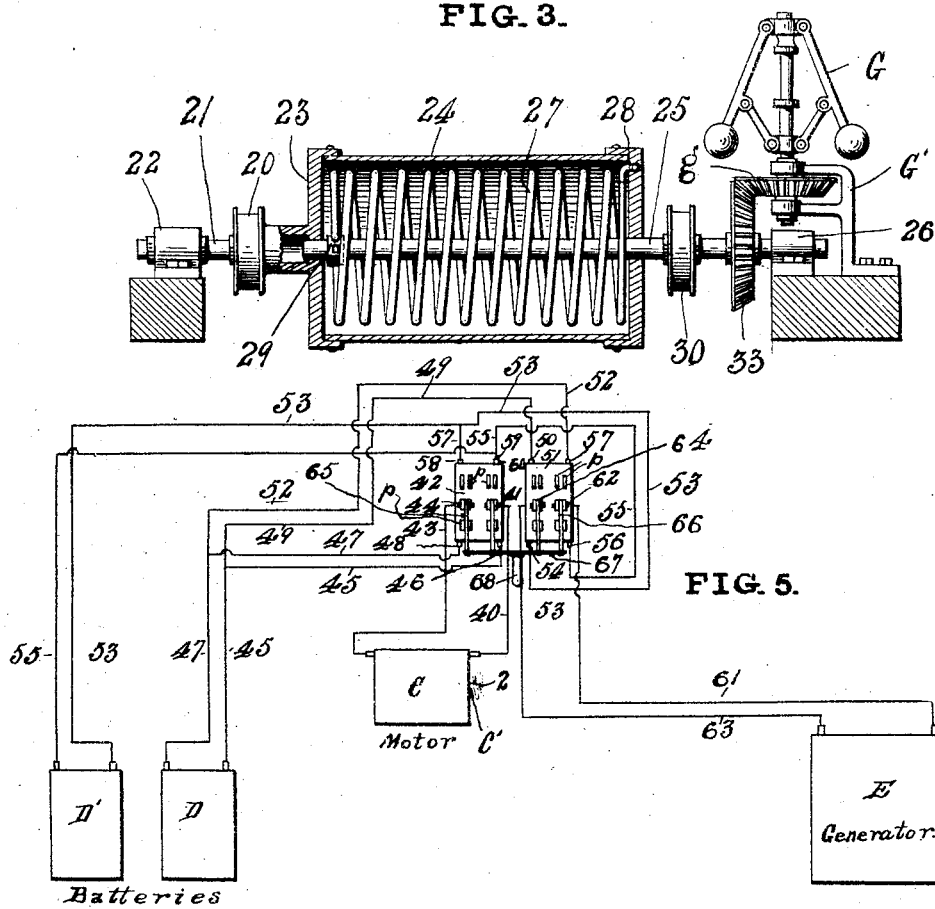
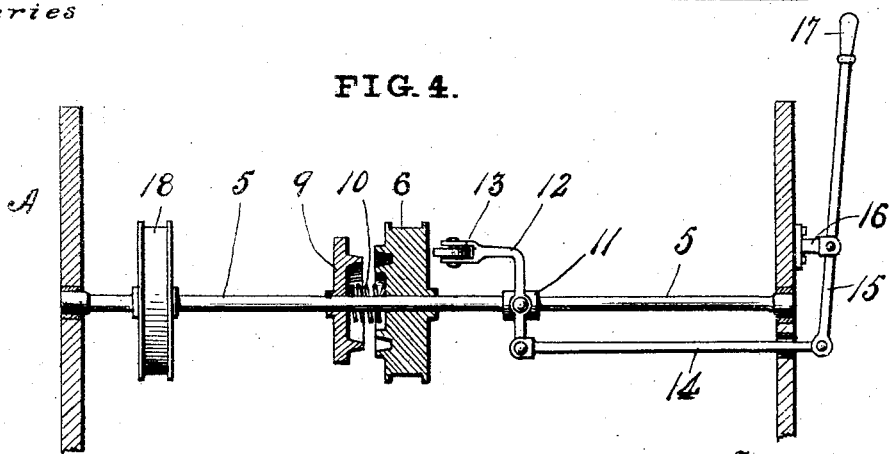

No. 778,133.	Patented December 20, 1904.

UNITED STATES PATENT OFFICE.

WARREN H. KEATES, OF ATLANTIC CITY, NEW JERSEY.

MOTOR-VEHICLE.

SPECIFICATION forming part of Letters Patent No. 778,133, dated December 20, 1904.

Application filed May 27, 1904. Serial No. 210,117.

*To all whom it may concern:*

Be it known that I, WARREN H. KEATES, a citizen of the United States, residing at Atlantic City, in the county of Atlantic and State of New Jersey, have invented certain new and useful Improvements in Motor-Vehicles, of which the following is a specification.

The object of my said invention is to provide means for utilizing power which is ordinarily lost in the operation of automobiles and other power-driven vehicles; and it consists in the construction and arrangement of mechanism for storing such power and utilizing it for generating electricity for charging the batteries which supply the power to the motor, and, further, in an arrangement of multiple batteries whereby one set of batteries may be used to run the motor while another set is being charged, all as will be hereinafter more fully described and claimed.

Figure 1:
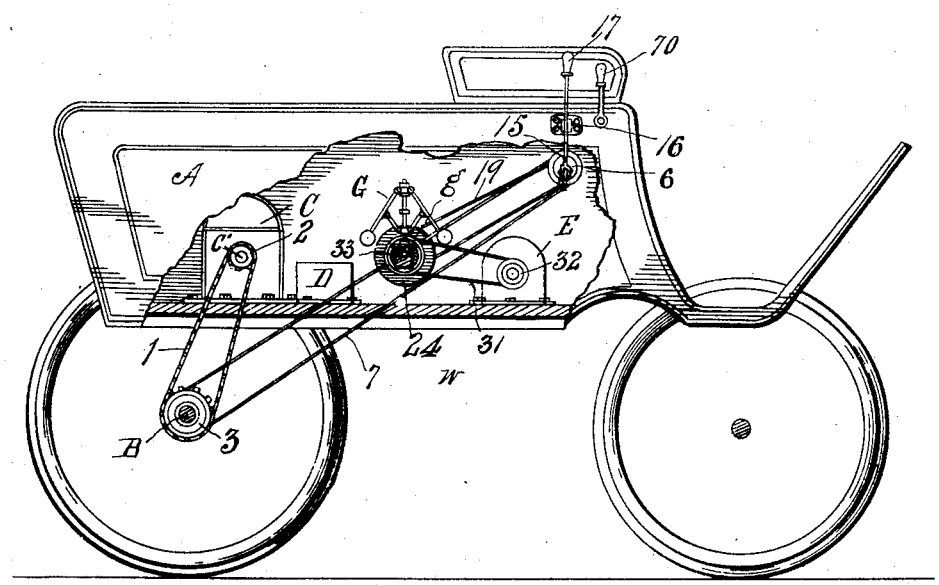
Figure 2:
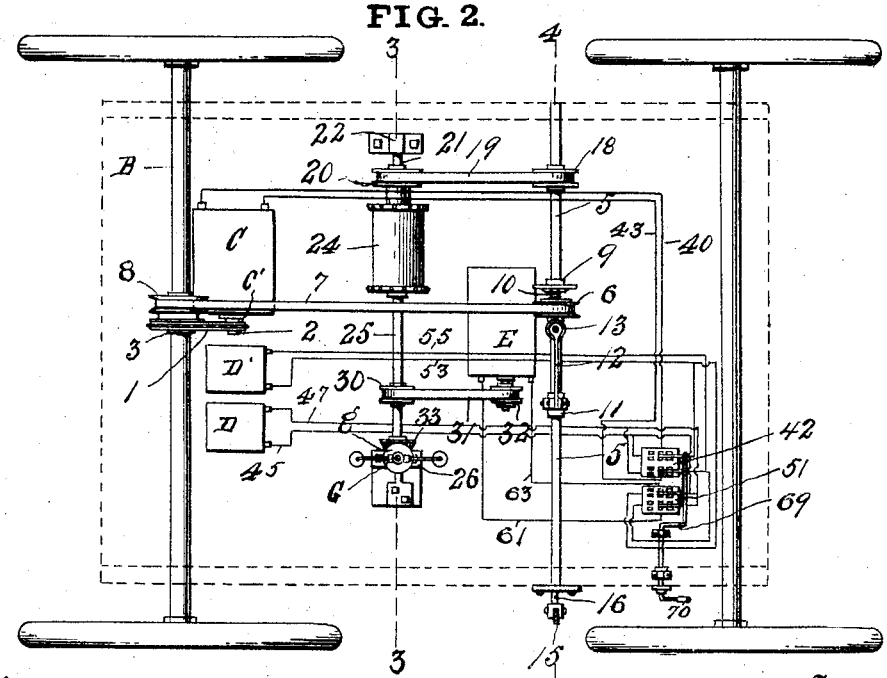

Referring to the accompanying drawings, which are made a part hereof, and on which similar reference characters indicate similar parts, Figure 1 is a side elevation of a motor-carriage or automobile embodying my said invention; Fig. 2, a top or plan view of the mechanism, with the body of the vehicle indicated by dotted lines; Fig. 3, a detail longitudinal section on the dotted line 3 3 in Fig. 2; Fig. 4, a detail section on the dotted line 4 4 in Fig. 2, and Fig. 5 a diagrammatic view to illustrate more clearly the electrical wiring and connections between the several parts of the apparatus.

In said drawings the portions marked A indicate the body of the vehicle; B, the main or driving axle; C, the motor; D, the battery, and E the generator.

The general construction of the vehicle, including the body A, axle B, and motor C, is or may be of any ordinary or approved construction and requires no special description herein, except incidentally in describing the operation of the parts which relate particularly to my invention.

The motor C is belted to the driving-axle B by means of a sprocket-chain 1 and the sprocket-wheels 2 and 3, mounted, respectively, on the motor-shaft C' and driving-axle B.

The batteries D D' and generator E are also of any ordinary or approved construction.

A shaft 5 is mounted in suitable bearings in the side of the framework of the body and extends transversely thereof. A belt-pulley 6 is mounted to revolve loosely on said shaft and is connected, by means of belt 7, with pulley 8, rigidly mounted on axle B alongside of the sprocket-wheel 3. One face of said pulley 6 is formed as a part of a clutch, and the other part of said clutch, consisting of a disk 9 with suitable engaging devices on its adjacent face, is rigidly mounted on said shaft 5 alongside of pulley 6. A coiled spring 10 is interposed between said pulley 6 and disk 9, which normally keeps them disengaged. A collar 11 is mounted loosely on said shaft 5 near pulley 6 and has a bell-crank lever 12 pivoted thereto. The end of said lever adjacent to pulley 6 is forked and has a rubber-faced wheel 13 journaled therein. The opposite end of said lever 12 is connected, by means of a link 14, with the lower end of a lever 15, pivoted in a bracket 16 on the side of the vehicle-body adjacent to the seat, where its handle 17 will be convenient to the operator. A pulley 18 is also rigidly mounted on shaft 5 and connected by belt 19 with a pulley 20 on a short shaft 21, which is journaled in suitable bearings 22 provided on an appropriate part of the framework. A disk 23 is also mounted on said shaft 21 and carries a cage or cylinder 24, which is adapted to revolve therewith. A shaft 25 is journaled in a suitable bearing 26 on an appropriate part of the framework at one end and at its other end in a bearing formed in the disk carried by said shaft 21 and extends centrally through cylinder 24. A coiled spring 27 is mounted within said cylinder 24, one end of which is connected at a point 28 with a part of said cylinder near its periphery and the other end of which is connected with shaft 25 at the opposite end of said cylinder, preferably by means of a collar 29, which is rigidly secured to said shaft. A pulley 30, rigidly mounted on said shaft 25, is connected by a belt 31 with pulley 32 on the end of the generator-shaft.

A governor G of an ordinary construction is mounted in a suitable bracket G' and is geared, by means of a gear-wheel $g$ on its shaft, to shaft 25, which carries a similar gear-wheel 33, which meshes therewith.

The several parts are electrically connected as follows: The motor C, the shaft C' of which is geared to the vehicle-shaft B, as before described, is connected at one side by a wire 40 with the central post 41 on one side of switchboard 42. Wire 43 runs from central post 44 on the opposite side of said board to the opposite side of said motor. Wire 45 connects one side of battery D with the corner-post 46 on one end of switchboard 42. Wire 47 connects post 48 on the opposite side of said board to the opposite side of said battery D. A wire 49 is tapped to wire 45 and connected to the corner-post 50 on one side of switchboard 51 at the end opposite the connection of wires 45 and 47 with board 42. A wire 52 is tapped to wire 47 and runs to post 53 on the opposite side of board 51. Battery D' is connected at one side by wire 53 with post 54 on one side of the opposite end of board 51. A wire 55 connects the opposite side of said battery D' with post 56 on the opposite side of said board 51. A short wire 57 is tapped onto wire 53 and connects with post 58 on one side of the opposite end of board 42. Another short wire, 59, is tapped onto wire 55 and connects with post 60 on the opposite side of said board. One side of generator E is connected by wire 61 to center post 62 on one side of switchboard 51, and a wire 63 connects the other side of said generator with center post 64 on the opposite side of said board. Each switchboard is provided with switches of ordinary form pivoted to its central posts and adapted to engage with contact-points $p$ on opposite ends of the switchboards, which are electrically connected to the posts on the adjacent corners. Switch 65 on board 42 and switch 66 on board 51 are shown connected by a bar 67 to be operated as a single switch by a handle 68, as shown in Fig. 5, or by a crank 69 and lever 70 alongside the vehicle-seat, as shown in Fig. 2. In Fig. 2 said switches are shown in one position, with battery D connected to generator E and battery D' to motor C, while in Fig. 5 they are shown in the other position, with the battery D connected to the motor C and battery D' to the generator E.

In operation the motor C is started by throwing the switches to connect one or the other battery therewith, and the vehicle is operated in the ordinary or any approved manner. After the vehicle is in motion the operator, through lever 15, will throw the pulley 6 into engagement with the disk 9, which through the connections with the driving-axle B by means of belt 7 will operate to start shaft 5 to revolving and through the belt 19 and connecting parts, above described, will also revolve cylinder or cage 24. This operates to coil or tighten spring 27, as will be readily understood, and when its tension reaches a sufficient degree will operate to start shaft 25 in motion and, through the connecting-belt 31, drive generator E. The power thus generated is transmitted through the wires above described to the battery not in use, which is thus charged. When the speed of the vehicle is slackened or the vehicle stopped, the generator is still kept in motion by means of the spring 27, which continues to uncoil until it is expanded to the point where its power is exhausted. This will keep the generator in motion during all such times as the vehicle in ordinary use is stopped and also be sufficient to maintain the speed of the generator at a uniform rate when the speed of the vehicle is lessened. Governor G will operate, as will be readily understood, to steady shaft 25 and prevent sudden changes of speed or "jerky" motion when the vehicle is stopped or started. By this means the generator is kept in operation at a substantially uniform speed, and the battery not in use is supplied with power while the other is being used. When the one in use becomes weak, the operator simply throws the switches over, which cuts out the weak battery and cuts in the strong or newly-charged one with the motor, at the same time connecting the weak one with the generator, so that it will be again charged while the power that has been previously stored in the other is being used. By this means the generator is kept in operation, not only during the time the vehicle is in motion, but also during ordinary stops, by means of the spring and at a substantially even speed at all times.

It will be understood, of course, that the particular arrangement shown of the parts of the apparatus is not essential to the operation of my invention, as they may be arranged to suit any style of vehicle or apparatus; further, that the invention is equally useful when the power of the batteries is to be used for lighting and other purposes, as when it is used to propel a vehicle. For example, no material change in the arrangement would be required to adapt the invention for use in lighting railroad-trains and similar uses.

Having thus fully described my said invention, what I claim as new, and desire to secure by Letters Patent, is—

1. In a motor-vehicle, the combination of an electric generator, a spring-motor geared thereto, a counter-shaft geared to said spring-motor and also to the driving-axle of the vehicle, and means for throwing said counter-shaft into or out of gear with said driving-axle, substantially as set forth.

2. In a motor-vehicle, the combination with the motor, battery, and generator, of a spring-motor mounted on an axle and connected by means of a suitable gear to said generator, a counter-shaft geared to said spring-motor and also to the driving-axle of the vehicle, a clutch mechanism on said counter-shaft for throwing into and out of gear said shaft, and means for operating said clutch mechanism connected with an operating-lever mounted alongside the operator's seat, substantially as set forth.

3. In a motor-vehicle, the combination with the motor, battery, and generator, of a counter-shaft connected with the driving-axle of the vehicle, means for throwing said counter-shaft into and out of gear with said driving-axle, a second shaft geared to said counter-shaft and having a cage or cylinder connected to rotate therewith, a shaft mounted to rotate independently thereof and within said cage or cylinder, a spring connected at one end to said cage and at the other end to said shaft, said shaft being also geared to drive the generator, substantially as set forth.

4. In a motor-vehicle, the combination with the motor, battery, and generator, of a counter-shaft journaled in suitable bearings on the vehicle-frame, an idle pulley mounted on said counter-shaft and connected by a belt with a driving-axle, a clutch part rigidly mounted on said counter-shaft alongside of said pulley, means for engaging and disengaging said pulley and clutch part, gearing connecting said counter-shaft and a second shaft journaled in suitable bearings on the vehicle-frame, a cage mounted on and carried by said second shaft, another shaft journaled within said cage to rotate independently thereof, a coiled spring connected at one end with said cage and at the other end with said shaft, and gearing connecting said shaft to the generator, substantially as set forth.

5. In a motor-vehicle, the combination of the motor, a plurality of batteries connected thereto through suitable switch connections whereby when part is connected with said motor the rest will be cut out, a generator connected through the same switches to be connected with the portion of the batteries not in use, and a connection with the vehicle for driving said generator, substantially as set forth.

6. In a motor-vehicle, the combination of the driving-axle, the motor geared thereto, a plurality of batteries each connected to said motor, but through opposite sides of a switchboard, a switch for throwing said batteries in or out, and a generator also connected with said batteries through the same switchboards but through the sides thereof opposite the connections with the motor, whereby when one battery is connected with the motor the other may be connected with the generator, and said batteries thus used alternately, substantially as set forth.

7. The combination with a motor-driven shaft, of plural batteries part connected with said motor and the other part with a generator, means for alternating the connection of said motor and generator with said different batteries, said generator, and a connection with the motor-driven shaft for driving it, substantially as set forth.

In witness whereof I have hereunto set my hand and seal, at Washington, District of Columbia, this 30th day of April, A. D. 1904.

WARREN H. KEATES. [L. S.]

Witnesses:
MARY A. WILSON,
E. W. BRADFORD.